June 15, 1965 W. ZIEG 3,188,690
APPARATUS FOR THE PRODUCTION OF CORRUGATED TUBES
Filed Aug. 26, 1964 2 Sheets-Sheet 2
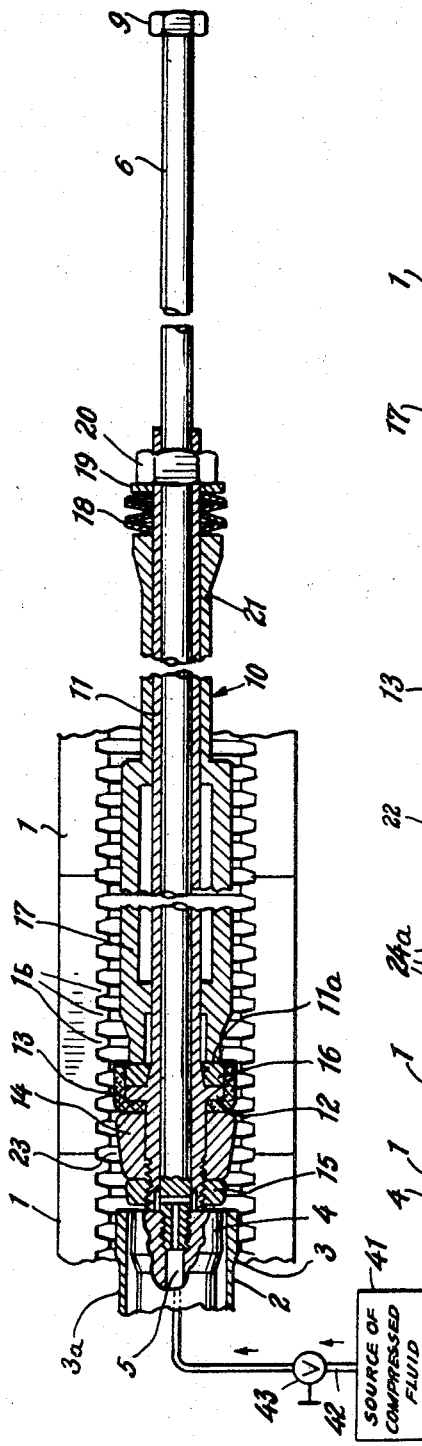
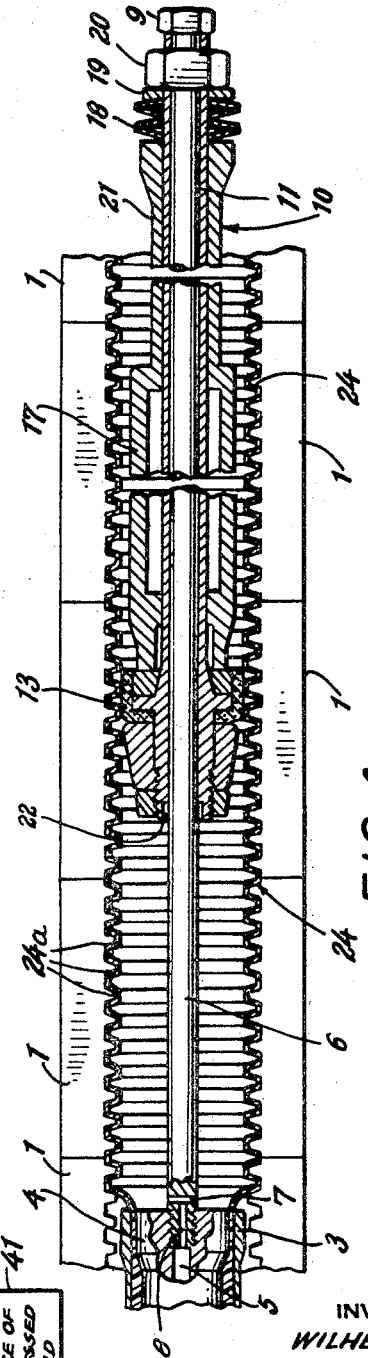
INVENTOR
*WILHELM ZIEG,*
BY
ATTORNEY United States Patent Office
3,188,690
Patented June 15, 1965

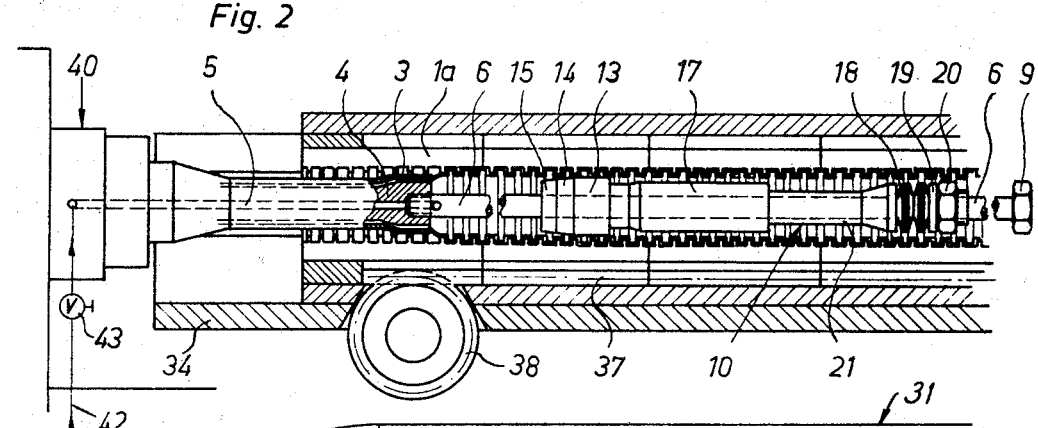
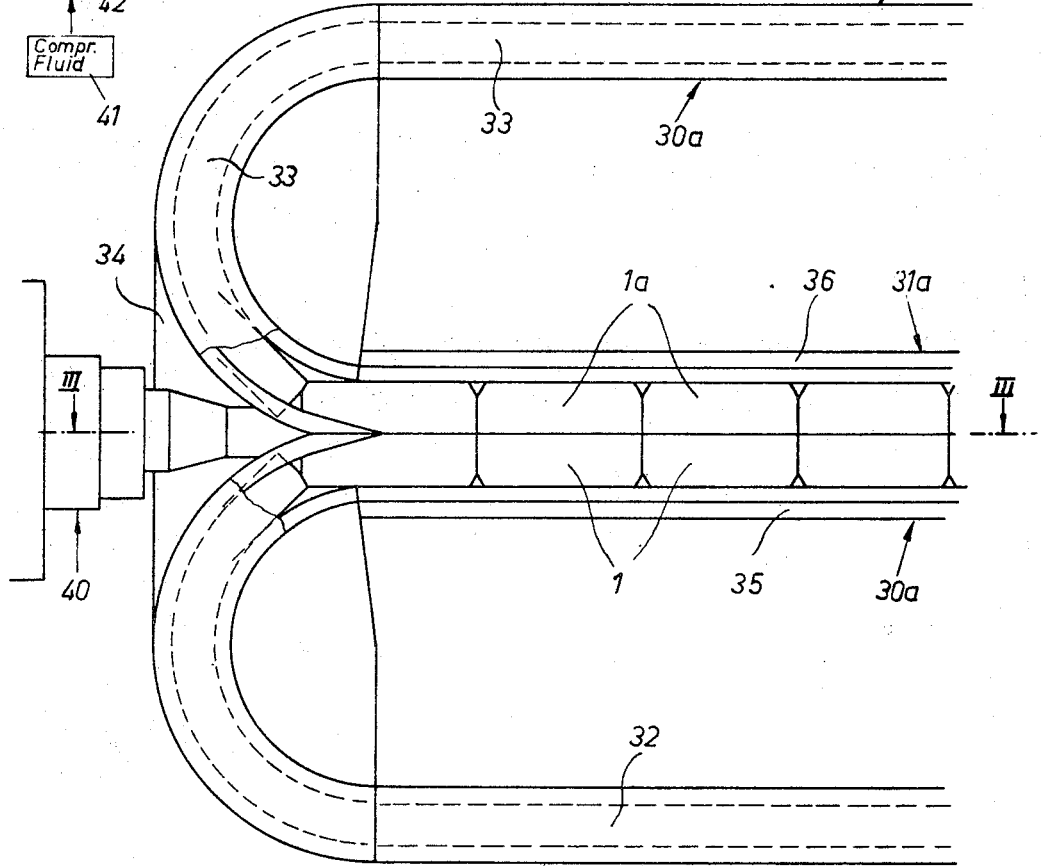

3,188,690
APPARATUS FOR THE PRODUCTION OF CORRUGATED TUBES
Wilhelm Zieg, Konigsberg, Bavaria, Germany, assignor to Frankische Isolierrohr- und Metallwaren-Werke Gebrueder Kirchner, Konigsberg, Bavaria, Germany
Filed Aug. 26, 1964, Ser. No. 392,096
Claims priority, application Germany, Feb. 21, 1959, F 27,771; Aug. 26, 1963, F 40,586
26 Claims. (Cl. 18—14)

This application is a continuation-in-part of my copending application, Serial No. 263,680, filed March 5, 1963, which, in turn, is a continuation-in-part of my application, Serial No. 861,806, filed December 24, 1959, now abandoned.

The present invention relates to an apparatus for the production of corrugated plastic tubes, and more particularly to an apparatus for the production of flexible tubes which preferably consist of synthetic thermoplastic material and are provided with circumferentially complete annular corrugations as contrasted with helical corrugations. Still more particularly, the invention relates to an improved arrangement which prevents collapsing of plastic tubes when the apparatus is started.

In said copending application, I disclose a method and an apparatus for the production of plastic tubes which consist of hardenable synthetic plastic material and are provided with circumferentially complete corrugations. The apparatus comprises two sets of substantially semitubular mold sections, also called half matrices, which are provided with internal ribs and are driven to advance in two endless paths having straight sections adjacent to each other and forming an elongated molding zone arranged to receive a length of plastic tube which issues from a suitable extruding machine. The interior of the tube is maintained at elevated pressure which causes its material to expand against suitably configurated internal surfaces of the mold sections whereby the tube is provided with circumferentially complete annular corrugations. Elevated pressure is maintained by compressed air or by another suitable fluid which may be introduced through the extrusion nozzle.

Such apparatus are very satisfactory for the production of circumferentially corrugated flexible plastic tubes with a diameter of up to about 2 inches. However, when the diameter of the tube exceeds two inches and when the wall thickness of the tube is small in comparison to its diameter, the tube is likely to collapse when the operation is started. This is due to the fact that the device which is intended to support the tube while the latter is still in deformable condition is normally located at a certain distance from the extrusion orifice. Thus, while the leading end of the freshly extruded tube advances toward the internal support and while the pressure in its interior is about to build up the tube is likely to collapse, particularly if its wall thickness is comparatively small. On the other hand, it is often desirable to reduce the wall thickness of circumferentially corrugated tubes to a minimum because the flexibility of such tubes exceeds substantially the flexibility of thick-walled tubes.

In order to avoid such collapsing of tubes at the time the apparatus is started, it was already proposed to provide the mold sections with suction ducts and to evacuate air from the space between the external surface of the tube and the internal surfaces of the surrounding mold sections. Such sections are rather expensive and, furthermore, the apparatus must be provided with a suction generating device which must be connected with travelling mold sections, thus adding considerably to the initial and maintenance cost of the entire unit. Still further, the pressure differential in the range of less than one full atmosphere is often insufficient to prevent collapse of the tube, especially if the tube is of large diameter and of negligible wall thickness.

Accordingly, it is an important object of the present invention to provide an improved apparatus for the production of circumferentially corrugated plastic tubes and to construct the apparatus in such a way that the tube is properly supported not only when the apparatus is in full operation but also at such times when the apparatus is started and when the danger of collapse or other deformation is particularly acute.

Another object of the invention is to provide an improved propping or supporting assembly which prevents collapse of plastic tubes immediately following the start of an extruding operation and which also serves to entrap the fluid in the interior of the tube.

A further object of the instant invention is to provide an improved extrusion unit which may be used in the apparatus of the above outlined characteristics and which is capable of cooperating with the novel propping or supporting assembly so as to positively prevent any undesirable deformation of the tube when the extruding operation begins.

Still another object of the invention is to provide an apparatus of the above outlined characteristics which is capable of producing circumferentially corrugated plastic tubes with a diameter exceeding by up to 100 percent and more the diameters of circumferentially corrugated plastic tubes produced in such conventional apparatus of which I have knowledge at this time.

A concomitant object of the invention is to provide a reciprocable propping or supporting device for circumferentially corrugated plastic tubes and to mount and operate the propping device in such a way that it can properly support a freshly extruded portion at the leading end of a plastic tube even though the interior of the tube is maintained at atmospheric pressure.

An additional object of the invention is to provide a propping device of the above outlined characteristics which does not interfere with the extruding and molding operations so that the tube may be extruded, shaped and otherwise processed at the same speed as in conventional apparatus which are used for similar purposes.

Still another object of the invention is to provide a propping device which is of exceptionally simple construction, which occupies little space, which occupies space that is normally available in apparatus for the production of circumferentially corrugated plastic tubes, and which may be readily detached from the remainder of the apparatus to undergo periodic inspection, cleaning or repair.

Briefly stated, the invention resides in the provision of an apparatus for producing flexible tubes of hardenable plastic material which comprises guide means defining two endless paths having straight parallel portions adjacent to each other and forming an elongated molding or deforming zone, a plurality of substantially semitubular mold sections arranged end-to-end in each endless path and having substantially semicircular transverse internal ribs whereby the ribs of a section in one of the paths cooperate with the ribs of a section in the other path to form annular ribs while such sections advance in the straight portions of the respective paths, means for advancing the sections at identical speeds so that the sections move seriatim from one end toward the other end of the molding zone, and an extruding machine having a nozzle comprising a tubular mantle adjacent to said one end of the molding zone and a core including a first portion surrounded by and defining with the mantle an annular orifice through which the plastic material issues into the molding zone at a rate corresponding to the speed of mold sections. The core further comprises an elongated extension which is preferably detachable from the first portion and extends through and beyond the molding zone, and the core is also provided with a bore serving to admit into the interior of the tube a compressed fluid delivered from an air compressor or another suitable source so that the compressed fluid expands the tube against the ribs of the mold sections to provide circumferential corrugations filling the spaces between the annular ribs. In accordance with the present invention, the extension of the core supports an axially reciprocable annular plunger which is normally adjacent to the extrusion orifice so that the leading end of the tube is supported from inside by sliding onto the plunger when the nozzle begins to extrude plastic material. The plunger is then advanced by the tube in a direction away from the orifice of the nozzle in response to continued extrusion of plastic material. It is preferred to provide the plunger with a conical portion which is adjacent to the extrusion orifice and whose diameter increases in a direction away from the first portion of the core.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1 is a fragmentary top plan view of an apparatus for the production of circumferentially corrugated plastic tubes which is equipped with a propping or supporting device embodying my invention;

FIG. 2 is a vertical section as seen in the direction of arrows from the line II—II of FIG. 1 and illustrates the drive mechanism which advances the mold sections;

FIG. 3 is another vertical section as seen in the direction of arrows from the line III—III of FIG. 1 and illustrates the construction of the propping device, this propping device being shown in its starting position; and FIG. 4 is a similar vertical section showing the propping device in a different position following the start of the extruding operation.

Referring first to FIGS. 1 and 2, there is shown a portion of an apparatus which is utilized for the production of circumferentially corrugated tubes consisting of hardenable synthetic plastic material. This apparatus comprises two sets of semitubular mold sections 1, 1a arranged to advance in two substantially oval endless paths 30, 31 having parallel straight portions 30a, 31a forming an elongated molding zone in which the sections 1, 1a are adjacent to and in actual abutment with each other. The sections are guided by suitably configurated guide means in the form of rails 32, 33 mounted on a base plate 34, and the sections advancing along the straight portions 30a, 31a may be cooled by a liquid which is circulated in cooling chambers 35, 36. The underside of each section 1, 1a is provided with a toothed rack 37 meshing with one of two coaxial pinions 38 (only one shown in FIG. 2) which are driven at necessary speed to advance the sections in the respective paths. The sections 1 and 1a are arranged end-to-end so that it suffices to drive a single section 1 and a single section 1a; the remaining sections are then compelled to share such movement and to advance seriatim through the molding zone which includes the straight sections 30a, 31a.

The apparatus further comprises an extruding machine 40 including an extrusion nozzle 2 best shown in FIGS. 3 and 4. FIG. 3 illustrates the parts of the apparatus in positions they assume when the extruding operation is about to begin. The nozzle 2 is located at one end of the straight molding zone and comprises a mantle 3 and a core having a first portion 4 which is surrounded by the mantle to define therewith an annular orifice 3a through the plastic material issues into the molding zone to form a tube 23. The first portion 4 of the core is provided with an axial bore 5 which is connected to a source 41 of compressed air, shown in FIG. 1. The conduit 42 connecting the source 41 with the bore 5 contains a pressure regulating valve 43 which is actuated when the apparatus is converted for the production of differently dimensioned tubes. When the apparatus is used for the production of tubes having a large diameter, the pressure in the molding zone will exceed one atmosphere absolute pressure and may be raised to two or more atmospheres, depending on the diameter of the product.

The tip of the first portion 4 is provided with internal threads to mesh with an elongated mandrel 6. This mandrel is a piece of metallic rod stock, preferably consisting of steel, and constitutes an extension of the first portion 4. That part of the mandrel 6 which is screwed into the first portion 4 is provided with an axial bore 8 which communicates with the bore 5 and with a diametral bore 7 provided in the mandrel and serving to admit compressed air into the interior of the tube 23 which is extruded through the annular orifice 3a between the mantle 3 and first portion 4. The distribution of bores 5, 7 and 8 as shown in FIG. 3 is very satisfactory when the apparatus is used for the production of tubes having a diameter of up to 40 mm. If the diameter of the tube is larger, I prefer to use a core whose first portion is provided with an annulus of axially extending bores terminating at the end face of the first portion and communicating with the axial bore 5 via radial bores whose outer ends are sealed by threaded plugs or the like. Such construction is more complicated but is of advantage because the jets of compressed fluid issuing from the axial bores do not impinge directly against the wall of the freshly extruded tube. It is to be noted that compressed fluid is admitted at higher pressure when the tube 23 is of large diameter, and such strong blasts of fluid could weaken certain portions of plastic material. It is further clear that the annulus of axial bores may be replaced by an annular groove which then communicates with the axial bore 5 of the first portion 4 via one or more radial bores. Also, it is possible to use a core whose first portion is provided with inclined bores diverging toward the end face of the first portion and serving to admit a compressed fluid in directions which are inclined with reference to the axis of the tube.

The right-hand end portion of the mandrel 6 is provided with external threads to take a stop nut 9 having four, six or more facets enabling an operator to detach it from the mandrel. The mandrel supports an axially reciprocable propping or supporting device in the form of an annular plunger 10. The plunger comprises an elongated inner sleeve 11 which is telescoped onto the mandrel and is slidable therealong. This inner sleeve 11 is provided with an annular flange 12 which is adjacent to but spaced from the left-hand end of the plunger and which is received in an annular collar 13 consisting of leather, heat-resistant synthetic plastic material, or the like. This collar is of U-shaped axial section and its radially inwardly extending portion abuts against the left-hand end face of the flange 12. The peripheral surface of the collar 13 faces the internal surfaces of the mold sections 1, 1a and it will be noted that these mold sections are provided with semicircular transverse internal ribs 1b of trapeziform cross section. However, it is to be understood that the cross sections of the ribs 1b may resemble triangles or rectangles, depending on the desired configuration of circumferential corrugations 24a which are to be formed in the material of the tube 23.

The inner sleeve 11 further supports a conical portion including an annular head 14 having a peripheral surface whose diameter increases in a direction toward the collar 13, i.e., away from the orifice 3a, and this head is adjacent to the left-hand end of the mandrel 6 when the apparatus is to be started, see FIG. 3. The means for detachably holding the head 14 in the position shown in FIGS. 3 and 4 comprises a nut 15 which is screwed onto the left-hand end of the inner sleeve 11. The head 14 preferably consists at least in part of a material which is a poor conductor of heat, for example, of laminated paper stock which is impregnated with shellac or another resinous substance and whose peripheral surface is finished to a high degree of smoothness. The impregnating substance transforms the paper layers into a solid block which is highly resistant to wear, which can be polished to a high degree of finish and wherein not only the spaces between the layers but also the pores of the layers themselves are filled with such substance. A material which has been found to be very suited for the production of the head 14 is sold under the name Pertinax (trademark). As a rule, the peripheral surface of the head will be polished to avoid undesirable friction between its material and the tube 23. The peripheral surface of the retaining nut 15 is of conical outline and preferably constitutes an extension of the peripheral surface of the head 14 so that the nut 15 and head 14 together constitute a frustoconical portion of the sleeve 11. An important advantage of this frustoconical portion is that it may be shaped in conventional machines at low cost and that it offers a uniform resistance to sliding movement of the tube 23. When the apparatus is used for the production of tubes having a large diameter, the head 14 is preferably replaced by a head having a conical peripheral surface and a recess in its end face of smaller diameter to accommodate the retaining nut so that the latter need not come in actual contact with the plastic material of the tube. Such concealed nut may be provided with axially extending blind bores to receive the prongs of a suitable wrench which serves to thread the nut onto the left-hand end of the inner sleeve 11. Of course, it is equally possible to provide the head 14 with a bushing which is formed with internal threads so that the nut 15 may be dispensed with and the head 14 may be screwed directly onto the inner sleeve.

The sleeve 11 comprises a conical portion 11a which is adjacent to the flange 12 and whose diameter diminishes in a direction away from the collar 13. This conical portion 11a is surrounded by a ring-shaped filler 16 which consists of elastically deformable material, for example, heat-resistant rubber or heat-resistant elastomeric material. The cylindrical portion of the collar 13 has an open end which faces away from the orifice 3a, and the filler 16 is received in this cylindrical portion. The filler 16 also abuts against the left-hand end face of an outer sleeve here shown as a cylinder 17 whose outer diameter is only slightly less than the smallest internal diameter of the corrugated tube 24, see FIG. 4. Thus, the cylinder 17 and the corrugated tube 24 define between themselves a labyrinth seal which impedes the escape of compressed fluid from the interior of the tube, such fluid being admitted through the bore 5 and bores 8, 7 in a manner as described above.

The right-hand end face of the cylinder 17 abuts against a package of dished springs 18 which bear against a washer 19 adjacent to an adjusting or actuating nut 20 which is screwed onto the right-hand end of the inner sleeve 11. The bias of the springs 18 may be regulated by rotating the nut 20 with reference to the inner sleeve. Such bias is transmitted to the deformable filler 16 which expands radially outwardly to increase the outer diameter of the expandible collar 13, i.e., the cylindrical portion of the collar 13 will move nearer to the internal surface of the corrugated tube 24 when the cylinder 17 is caused to reduce the axial length of the filler 16. The parts 16–20 together constitute an actuating device which serves to expand the cylindrical portion of the collar 13 toward the internal surface of the tube. The cylinder 17 comprises a main body portion which cooperates with the tube 24 to form the aforementioned labyrinth seal, and an annular neck portion 21 which is in actual abutment with the dished springs 18. It is clear that the springs 18 may be replaced by a helical spring or by another biasing device. The length of the neck portion 21 is preferably selected in such a way that the total length of the plunger 10 exceeds the length of the molding zone whereby the operators are in a position to manipulate the plunger when the apparatus is in actual use. In other words, the nut 20 extends to the right and beyond the straight portions 30a, 31a, as viewed in FIG. 1. Thus, an operator can grasp the nut 20 in order to push the plunger 10 axially until the inner sleeve is moved in actual abutment with the right-hand end face of the first portion 4. Consequently, and since the plunger must be free to reciprocate along the mandrel 6, the length of this mandrel exceeds at least slightly the axial length of the plunger.

FIGS. 3 and 4 show that the left-hand end portion of the inner sleeve 11 is provided with a short annular groove 22 which registers with the radial bores 7 when the plunger 10 is in the position of FIG. 3 and allows compressed fluid to escape from the mandrel 6. Such fluid then acts against the right-hand end face of the first portion 4 and causes the plunger to move in a direction to the right, as viewed in FIG. 3 or 4. As a rule, the left-hand end face of the inner sleeve 11 and/or the right-hand end face of the first portion 4 is provided with grooves, channels or similar unevennesses to prevent adherence of the inner sleeve to the first portion of the core when the plunger is moved to the position of FIG. 3. In other words, it is desirable to provide suitable passages through which the compressed fluid may penetrate from the groove 22 into the interior of the freshly extruded leading end of the plastic tube 23. Such adherence of the inner sleeve 11 to the first portion 4 of the core would be possible if the abutting ends of these parts were provided with highly polished surfaces. Alternatively, the end face of the inner sleeve 11 may be provided with a small protuberance which keeps it at a distance (e.g., 0.5 mm.) from the end face of the first portion 4. The smallest diameter of the nut 15 at most equals but is preferably less than the diameter of the end face on the first portion 4 of the core. The angle enclosed by the periphery of the conical portion 14, 15 with the axis of the mandrel 6 may be about 10 degrees, and the maximum diameter of this conical portion is only slightly less than the smallest internal diameter of the tube 24. For example, the difference between the maximum diameter of the head 14 and the smallest internal diameter of the corrugated tube 24 may be of a small fraction of a millimeter to avoid uncontrolled escape of compressed fluid.

The apparatus of my invention operates as follows:

When the operation is to begin, the person in charge pushes the plunger 10 all the way to the left, as viewed in FIG. 3, so that the end face of the inner sleeve 11 is immediately adjacent to and normally abuts against the end face of the first portion 4 of the core. The filler 16 is not subjected to axial stresses so that the diameter of the collar 13 is reduced to a minimum value. In the next step, the operator starts the extruding machine 40 whereby the annular orifice 3a between the mantle 3 and the first portion 4 begins to discharge a plastic tube 23 which is in deformable condition and whose internal surface slides along the highly polished peripheral surface of the conical portion 14, 15. The pinions 38 are driven so that the mold sections 1, 1a advance at requisite speed by moving in a direction from the left to the right, as viewed in FIG. 3 or 4. The valve 43 is open so that the bore 5 admits compressed fluid which flows through bores 8, 7, grooves 22 and between the end faces of the inner sleeve 11 and first portion 4 to penetrate into the interior of the tube 23. The head 14 causes the leading end of the tube 23 to expand and this tube begins to exhibit pronounced corrugations 24a because its materials is expanded by compressed fluid issuing from the annular groove 22. As soon as the material of the tube 23 begins to penetrate into the spaces between the ribs 1b, the tube entrains the plunger 10 until the right-hand end of the inner sleeve 11 abuts against the stop nut 9. In the meantime, the leading end of the tube 23 has hardened sufficiently to be selfsupporting and begins to slide along the head 14 and collar 13 because the nozzle 2 continues to extrude plastic material. Thus, the properly corrugated tube 24 then simply travels about the head 14 and sleeve 13. The operator then rotates the nut 20 to reduce the axial length of the filler 16 and to expand the collar 13 radially outwardly until the outer diameter of the collar approximates the inner diameter of the tube 24. The apparatus is now ready for continuous operation and discharges a continuous length of tube 24 which is provided with circumferentially complete corrugations 24a.

It is often desirable to preheat the head 14 before the plunger 10 is moved to the position of FIG. 3, especially if the head consists of metallic material. Such heating prevents premature hardening of plastic material which is undesirable, especially when the plunger has moved in abutment with the nut 9, because the tube could not slide freely with reference to the plunger. A metallic head may be preheated with a soldering lamp or the like.

A head consisting of Pertinax need not be heated because its heat-absorption capacity is very low. If desired, the heat-absorption capacity of the head may be reduced still further by replacing it with a hollow conical frustum.

The cooling chambers 35, 36 exchange heat with the mold sections 1, 1a and with the tube 24 so that the latter is caused to set at a short distance from the extrusion nozzle 2 and can withstand the pressure of entrapped air. The chambers 35, 36 may be replaced by other types of cooling devices, for example, by coils which are convoluted around the mold sections advancing along the molding zone or by nozzles which discharge jets of coolant against the external surfaces of the mold sections.

Circumferentially corrugated tubes of the type produced in the apparatus of my invention are useful as protective sheaths for electric wiring, as drain pipes and for many other purposes where great flexibility is desirable simultaneously with strong resistance to permanent deformation. The moment of inertia of such tubes is small in planes which are perpendicular to the axis of the tube but much higher in axial planes.

The distance between the stop nut 9 and the orifice 3a is normally selected in such a way that the distance between the nut 15 and the orifice is between one-half and two-thirds of the length of the molding zone when the sleeve 11 abuts against the nut 9.

A very important advantage of the collar 13 is that it allows for unimpeded passage of the tube 23 when the operation is started. Thus, when the machine 40 begins to extrude plastic material and the leading end of the tube 23 engages the conical surfaces of the nut 15 and head 14, the material tends to curl and the wall thickness of the leading end increases. Were the collar 13 expanded immediately when the extruding operation begins, the thick-walled leading end would be unable to pass through the narrow annular gap which surrounds the cylindrical portions of the collar 13. However, once the apparatus is running and the leading end of the tube has advanced well beyond the collar 13, the latter should be expanded radially to prevent uncontrolled escape of compressed fluid. In fact, and particularly when the collar 13 consists of leather, it may be expanded in actual sliding engagement with the internal surface of the tube to positively prevent any leakage of compressed fluid.

Without further analysis, the foregoing will so fully reveal the gist of the present invention that others can, by applying current knowledge, readily adapt it for various applications without omitting features which, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections at identical speeds in a direction from one end toward the other end of said molding zone; an extruding machine having a nozzle comprising a tubular mantle adjacent to said one end of the molding zone and a core including a first portion surrounded by and defining with said mantle an annular orifice through which the plastic material issues into said zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and a plunger reciprocably supported by said extension and normally adjacent to said orifice so that the leading end of the tube is supported internally by sliding onto said plunger when the machine begins to extrude plastic material, said plunger being advanced by the tube in a direction away from said orifice in response to continued extrusion of plastic material.

2. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections at identical speed in a direction from one end toward the other end of said molding zone; an extruding machine having a nozzle comprising a tubular mantle adjacent to said one end of the molding zone and a core including a first portion surrounded by and defining with said mantle an annular orifice through which the plastic material issues into said zone to form a tube, said core including an elongated extension extending through said molding zone and said core having a bore arranged to admit a compressed fluid into the tube issuing from said orifice, and stop means provided on said extension at a point distant from said orifice; means for admitting compressed fluid into said bore so that the tube is expanded against and follows the outlines of said annular ribs; and a plunger reciprocably supported by said extension and having a conical portion normally adjacent to said orifice so that the leading end of the tube is supported internally by sliding onto said plunger when the machine begins to extrude plastic material, said plunger being advanced by the tube in a direction away from said orifice and in abutment with said stop means in response to continued extrusion of plastic material, the diameter of said conical portion increasing in a direction away from said orifice.

3. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections at identical speeds in a direction from one end toward the other end of said molding zone; an extruding machine having a nozzle comprising a tubular mantle adjacent to said one end of the molding zone and a core including a first portion surrounded by and defining with said mantle an annular orifice through which the plastic material issues into said zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and a plunger reciprocably supported by said extension and having a conical portion normally immediately adjacent to said orifice, so that the leading end of the tube is supported internally by sliding onto said plunger when the machine begins to extrude plastic material, said plunger being advanced by the tube in a direction away from said orifice in response to continued extrusion of plastic material, the diameter of said conical portion increasing in a direction away from said orifice.

4. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections at identical speeds in a direction from one end toward the other end of said molding zone; an extruding machine having a nozzle comprising a tubular mantle adjacent to said one end of the molding zone and a core including a first portion surrounded by and defining with said mantle an annular orifice through which the plastic material issues into said zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and an annular plunger reciprocably supported by said extension and normally in face-to-face abutment with the first portion of said core so that the leading end of the tube is supported internally by sliding onto said plunger when the machine begins to extrude plastic material, said plunger being advanced by the tube in a direction away from said orifice in response to continued extrusion of plastic material.

5. An apparatus as set forth in claim 4, wherein said plunger comprises a conical portion normally adjacent to and diverging in a direction away from said orifice, said conical portion having an annular end face whose diameter at most equals the diameter of the first portion of said core.

6. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections at identical speeds in a direction from one end toward the other end of said molding zone; an extruding machine having a nozzle comprising a tubular mantle adjacent to said one end of the molding zone and a core including a first portion surrounded by and defining with said mantle an annular orifice through which the plastic material issues into said zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and a plunger reciprocably supported by said extension and having a frustoconical end portion normally adjacent to said orifice so that the leading end of the tube is supported internally by sliding onto said plunger when the machine begins to extrude plastic material, said plunger being advanced by the tube in a direction away from said orifice, in response to continued extrusion of plastic material, the diameter of said frustoconical end portion increasing in a direction away from said orifice.

7. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections at identical speeds in a direction from one end toward the other end of said molding zone; an extruding machine having a nozzle comprising a tubular mantle adjacent to said one end of the molding zone and a core including a first portion surrounded by and defining with said mantle an annular orifice through which the plastic material issues into said zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and a plunger reciprocably supported by said extension and having a conical portion normally adjacent to said orifice so that the leading end of the tube is supported internally by sliding onto said plunger when the machine begins to extrude plastic material, said plunger being advanced by the tube in a direction away from said orifice in response to continued extrusion of plastic material, the diameter of said conical portion increasing in a direction away from said orifice and the angle enclosed by the periphery of said conical portion with the axis of said core being about 10 degrees.

8. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections at identical speeds in a direction from one end toward the other end of said molding zone; an extruding machine having a nozzle comprising a tubular mantle adjacent to said one end of the molding zone and a core including a first portion surrounded by and defining with said mantle an annular orifice through which the plastic material issues into said zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and a plunger reciprocably supported by said extension and having a conical portion consisting at least in part of a material which is a poor conductor of heat and normally adjacent to said orifice so that the leading end of the tube is supported internally by sliding onto said conical portion when the machine begins to extrude plastic material, said plunger being advanced by the tube in a direction away from said orifice in response to continued extrusion of plastic material and the diameter of said conical portion increasing in a direction away from said orifice.

9. An apparatus as set forth in claim 8, wherein the conical portion of said plunger consists at least in part of synthetic plastic material.

10. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections from one end toward the other end of said molding zone; an extruding machine having a nozzle comprising a tubular mantle adjacent to said one end of the molding zone and a core including a first portion surrounded by and defining with said mantle an annular orifice through which the plastic material issues into said molding zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and an annular plunger reciprocably supported by said extension and having a hollow conical portion normally adjacent to said orifice so that the leading end of the tube is supported internally by sliding onto said conical portion when the machine begins to extrude plastic material, said plunger being advanced by the tube in a direction away from said orifice in response to continued extrusion of plastic material and the diameter of said conical portion increasing in a direction away from said mantle.

11. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections from one end toward the other end of said molding zone; an extruding machine having a nozzle comprising a tubular mantle adjacent to said one end of the molding zone and a core including a first portion surrounded by and defining with said mantle an annular orifice through which the plastic material issues into said molding zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and an annular plunger reciprocably supported by said extension and having a hollow conical portion normally adjacent to said orifice so that the leading end of the tube is supported internally by sliding onto said conical portion when the machine begins to extrude plastic material, said plunger being advanced by the tube in a direction away from said orifice in response to continued extrusion of plastic material and the diameter of said conical portion increasing in a direction away from said mantle, the maximum diameter of said conical portion being slightly less than the smallest internal diameter of the corrugated tube.

12. An apparatus as set forth in claim 11, wherein the difference between the maximum diameter of said conical portion and the smallest internal diameter of the corrugated tube is a fraction of a millimeter.

13. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections from one end toward the other end of said molding zone; an extruding machine having a nozzle comprising a tubular mantle adjacent to said one end of the molding zone and a core including a first portion surrounded by and defining with said mantle an annular orifice through which the plastic material issues into said molding zone to form a tube, said core including an elongated rigid coaxial rod-like extension extending through said molding zone and said core having a bore arranged to admit a compressed fluid into the tube issuing from said orifice; means for admitting compressed fluid into said bore so that the tube is expanded against and follows the outlines of said annular ribs; and an annular plunger reciprocably supported by said rod-like extension and normally adjacent to said orifice so that the leading end of the tube is supported internally by sliding onto said plunger when the machine begins to extrude plastic material, said plunger being advanced by the tube in a direction away from said orifice in response to continued extrusion of plastic material.

14. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections from one end toward the other end of said molding zone; an extruding machine having a nozzle comprising a tubular mantle adjacent to said one end of the molding zone and a core including a first portion surrounded by and defining with said mantle an annular orifice through which the plastic material issues into said molding zone to form a tube, said core including an elongated extension through and beyond the other end of said molding zone and said core having a bore arranged to admit a compressed fluid into the tube issuing from said orifice; means for admitting compressed fluid into said bore so that the tube is expanded against and follows the outlines of said annular ribs; and an annular plunger reciprocably supported by said extension and normally adjacent to said orifice so that the leading end of the tube is supported internally by sliding onto said plunger when the machine begins to extrude plastic material, said plunger being advanced by the tube in a direction away from said orifice in response to continued extrusion of plastic material.

15. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections from one end toward the other end of said molding zone; an extruding machine having a nozzle comprising a tubular mantle adjacent to said one end of the molding zone and a core including a first portion surrounded by and defining with said mantle an annular orifice through which the plastic material issues into said molding zone to form a tube, said core including an elongated extension extending through said molding zone and said core having a bore arranged to admit a compressed fluid into the tube issuing from said orifice; means for admitting compressed fluid into said bore so that the tube is expanded against and follows the outlines of said annular ribs; and an annular plunger reciprocably supported by said extension and having a hollow conical portion normally adjacent to said orifice so that the leading end of the tube is supported internally by sliding onto said conical portion when the machine begins to extrude plastic material, said plunger being advanced by the tube in a direction away from said orifice in response to continued extrusion of plastic material and the diameter of said conical portion increasing in a direction away from said mantle, said plunger further having an annular collar adjacent to the larger-diameter end of said conical portion.

16. An apparatus as set forth in claim 15, wherein said collar consists of leather.

17. An apparatus as set forth in claim 15, wherein said collar consists of heat-resistant synthetic plastic material.

18. An apparatus as set forth in claim 15, wherein said collar consists of expandable material and wherein said plunger further comprises actuating means for expanding said collar radially outwardly toward the internal surface of the tube.

19. An apparatus as set forth in claim 18, wherein said collar comprises a cylindrical portion which has an open end facing away from said orifice and wherein said actuating means comprises an annular filler of deformable material received in said cylindrical portion and means for compressing said filler axially whereby the filler expands radially and simultaneously expands said cylindrical portion.

20. An apparatus as set forth in claim 19, wherein said plunger comprises an inner sleeve slidably supported by said extension and having a conical portion surrounded by said filler, said last named conical portion diverging in a direction toward said orifice.

21. An apparatus as set forth in claim 19, wherein the means for compressing said filler comprises an inner sleeve slidably telescoped onto said extension and supportingly connected with said collar so that the collar shares all axial movements thereof, an outer sleeve slidably mounted on said inner sleeve and abutting against said filler, and means for changing the axial position of said outer sleeve with reference to said inner sleeve whereby said filler is compressed when the outer sleeve is moved in a direction toward said orifice.

22. Apparatus as set forth in claim 21, wherein said inner sleeve comprises an externally threaded end distant from said orifice and wherein the means for changing the axial position of said outer sleeve comprises a nut meshing with said externally threaded end.

23. An apparatus as set forth in claim 22, further comprising resilient means interposed between said nut and said outer sleeve to bias the latter in compressive engagement with said filler.

24. In an apparatus for producing tubes of hardenable plastic material, guide means defining an elongated molding zone; pairs of cooperating substantially semitubular mold sections arranged to move through said molding zone, each of said sections having substantially semicircular transverse internal ribs whereby the ribs of one section of each pair cooperate with the ribs of the other section of the same pair to form annular ribs while the sections advance in said molding zone; advancing means for moving said pairs of sections from one end toward the other end of said molding zone; an extruding machine having a nozzle comprising a tubular mantle adjacent to said one end of the molding zone and a core including a first portion surrounded by and defining with said mantle an annular orifice through which the plastic material issues into said molding zone to form a tube, said core including an elongated extension extending through said molding zone and said core having a bore arranged to admit a compressed fluid into the tube issuing from said orifice; stop means provided on said extension at a point distant from said orifice; means for admitting compressed fluid into said bore so that the tube is expanded against and follows the outlines of said annular ribs; and an annular plunger reciprocably supported by said extension and having a conical portion normally adjacent to said orifice so that the leading end of the tube is supported internally by sliding onto said conical portion when the machine begins to extrude plastic material, said plunger being advanced by the tube in abutment with said stop means in response to continued extrusion of plastic material and said plunger further having a cylindrical portion adjacent to the larger-diameter end of said conical portion and arranged to form a labyrinth seal with the corrugated tube when the plunger abuts against said stop means and said machine continues to extrude plastic material so that the tube is compelled to slide along said cylindrical portion.

25. An apparatus as set forth in claim 24, wherein said plunger further comprises an annular collar consisting of expandable material and disposed intermediate said conical portion and said cylindrical portion, and means for expanding said collar radially outwardly toward the internal surface of the tube.

26. An apparatus for producing tubes of hardenable synthetic plastic material, in combination, guide means defining two endless paths having straight portions adjacent to and parallel with each other to form an elongated molding zone; a plurality of substantially semitubular mold sections arranged end-to-end in each of said paths and having substantially semicircular transverse internal ribs whereby the ribs of a section in one of said paths cooperate with the ribs of a section in the other path to form annular ribs while such sections advance in said straight portions of the respective paths; means for advancing said sections at identical speeds so that the sections move seriatim from one end toward the other end of said molding zone; a nozzle having a tubular mantle adjacent to said one end of the molding zone and a core including a first portion surrounded by and defining with said mantle an annular orifice through which the plastic material issues into said zone to form a tube, said core further including an elongated extension detachably secured to said first portion and extending through and beyond said molding zone, said core also having a bore communicating with the interior of the plastic tube which is extruded through said orifice; means for admitting a compressed gas into said bore so that the gas expands the tube against the ribs of said sections; an annular plunger reciprocably supported by said extension and normally immediately adjacent to said first portion of the core so that the leading end of the tube is supported from inside by sliding onto the plunger when said nozzle begins to extrude plastic material, said plunger being advanced by the tube in a direction away from said orifice in response to continued extrusion of plastic material; and stop means for arresting said plunger at a predetermined distance from said orifice whereby, on continued extrusion of plastic material, the tube slides along and past the plunger.

References Cited by the Examiner
UNITED STATES PATENTS

| | | | |
|---|---|---|---|
| 2,194,313 | 3/40 | Loomis | 18—14 XR |
| 2,491,589 | 12/49 | Slaughter | 18—14 |
| 2,708,772 | 5/55 | Moncliff | 18—14 XR |
| 2,760,228 | 8/56 | Verges | 18—14 XR |

WILLIAM J. STEPHENSON, *Primary Examiner.*